(12) United States Patent
Boenapalli et al.

(10) Patent No.: US 12,333,146 B2
(45) Date of Patent: Jun. 17, 2025

(54) PACKED COMMANDS FOR COMMUNICATING WITH FLASH MEMORY SYSTEM

(71) Applicant: QUALCOMM Incorporated, San Diego, CA (US)

(72) Inventors: Madhu Yashwanth Boenapalli, Hyderabad (IN); Sai Praneeth Sreeram, Anantapur (IN); Surendra Paravada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 18/181,421

(22) Filed: Mar. 9, 2023

(65) Prior Publication Data
US 2024/0302965 A1    Sep. 12, 2024

(51) Int. Cl.
*G06F 3/00* (2006.01)
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ............ G06F 12/0246; G06F 13/1668; G06F 2212/7203; G06F 2212/7204; G06F 3/061; G06F 3/0611; G06F 3/0659; G06F 3/0679
See application file for complete search history.

(56) References Cited

U.S. PATENT DOCUMENTS

2022/0179587 A1* 6/2022 Spector ................. G06F 3/0658
2022/0222011 A1* 7/2022 Choi ..................... G06F 3/0659

OTHER PUBLICATIONS

International Search Report and Written Opinion—PCT/US2024/010704—ISA/EPO—Apr. 25, 2024.

* cited by examiner

*Primary Examiner* — Yong J Choe
(74) *Attorney, Agent, or Firm* — NORTON ROSE FULBRIGHT US LLP/Qualcomm

(57) ABSTRACT

This disclosure provides systems, methods, and devices for memory systems that support packed commands for improved performance and reduced power consumption. In a first aspect, a method of accessing data in a flash memory system includes a host memory controller receiving a plurality of commands from a storage driver for execution by a flash memory device; packaging, by the memory controller of the host device, the plurality of commands as a packed command in a packet; and transmitting, by the memory controller of the host device to the flash memory device, the packet comprising the packed command for execution by the flash memory device. The use of packed commands may be based on determining the command acknowledgement delay from the flash memory device exceeds a threshold delay. Other aspects and features are also claimed and described.

22 Claims, 9 Drawing Sheets

PACKED COMMANDS FOR COMMUNICATING WITH FLASH MEMORY SYSTEM

TECHNICAL FIELD

Aspects of the present disclosure relate generally to an apparatus and method for controlling a memory device. Some aspects may, more particularly, relate to an apparatus and method for controlling operations for protection of data communicated to a memory storage device.

INTRODUCTION

As the value and use of information continues to increase, individuals and businesses seek additional ways to process and store information. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, magnetic-based memory systems, such as hard disk drives (HDDs), store data by encoding data as a combination of small magnets. As another example, optical-based memory systems, such as digital versatile discs (DVDs) and Blu-ray media, store data by encoding data as physical bits that cause different reflections when illuminated by a light source. As a further example, electronic memory devices store data as collections of electrons that can be detected through voltage and/or current measurements.

Electronic memory devices can be advantageous in certain systems in that they may access data quickly and consume a small amount of power. Examples of an electronic memory device having these advantages include universal serial bus (USB) memory devices (sometimes referred to as "memory sticks"), a memory card (such as used in some cameras and gaming systems), and solid state drive (SSDs) (such as used in laptop computers). NAND flash memory is one kind of memory device that may be used in electronic memory devices. NAND flash memory is manufactured into memory cards or flash disks. Example memory cards include compact flash (CF) cards, multimedia cards (eMMCs), smart media (SM) cards, and secure digital (SD) cards.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Performance of a flash memory system may be improved by applying latency mitigation techniques to reduce command acknowledgement delay occurring inside a flash memory system. A host device coupled to the flash memory system may detect an acknowledgement (AFC) latency pattern causing command acknowledgement delay based on a response time stamp or window size change for the AFC traversing from the flash memory system to the host device. In response, mitigation operations may be applied based on rules applied to the AFC latency pattern. The mitigation operations may include early preparation of commands, packing of multiple commands in a single packet, and/or increasing the mode of operation of an interface between the flash memory system and the host device. The AFC latency pattern may continue to be evaluated, and the mitigation techniques may be cancelled when certain criteria are satisfied.

The AFC mitigation techniques may improve performance when aging of the flash memory system increases latency for the flash memory device to respond to commands. Using packed commands, the host can send multiple commands without waiting for an acknowledgement of a command before sending a subsequent command. Mitigating the AFC latency may allow the flash memory system to complete queued commands in a shorter period of time. The flash memory system may enter a hibernation mode after completing queued commands, which is a lower-power consumption mode for the flash memory system. The decreased latency allowed by the packed command may allow the flash memory system to enter hibernation mode faster and increase power savings, which is beneficial particularly for mobile devices with limited energy storage.

In one aspect of the disclosure, a memory device includes a memory controller coupled to a memory module through a first channel and configured to access data stored in the memory module through the first channel; and coupled to a host device through a first interface, such as a memory interface, and configured to communicate with the host device over the first interface. The memory controller of the memory device may be configured to perform operations including receiving, from the host device, a packed command in a packed command packet, the packed command comprising a plurality of commands; and transmitting, to the host device, an acknowledgment frame corresponding to the plurality of commands after receiving the packed command packet. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

In an additional aspect of the disclosure, an apparatus includes a memory controller of a host device configured to couple the host device to a memory system through a first interface, the memory controller configured to perform operations including receiving, by the memory controller of a host device, a plurality of commands from a storage driver for execution by a flash memory device; packaging, by the memory controller of the host device, the plurality of commands as a packed command in a packet; and transmitting, by the memory controller of the host device to the flash memory device, the packet comprising the packed command for execution by the flash memory device. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for storing, retrieving, and organizing data in a memory system. Aspects of this disclosure provide for operations and data structures used in those operations for reducing the effect of command acknowledgement delay in a memory system, such as may be caused by flash device aging, on memory performance. The techniques may include the use of packed transmissions, including a packed command including a plurality of commands, between the host device and the memory system. The memory system may acknowledge the packed command with a single acknowledgement, which reduces the number of acknowledgements transmitted on the interface between the memory system and the host device.

Particular implementations of the subject matter described in this disclosure may be implemented to realize one or more of the following potential advantages or benefits. In some aspects, the present disclosure provides techniques for improved performance of a memory system, such as by mitigating effects of aging of memory blocks in the memory system. The improved performance also reduces power consumption by allowing the memory system to enter lower-power states sooner by completing commands quicker.

Figure 1:
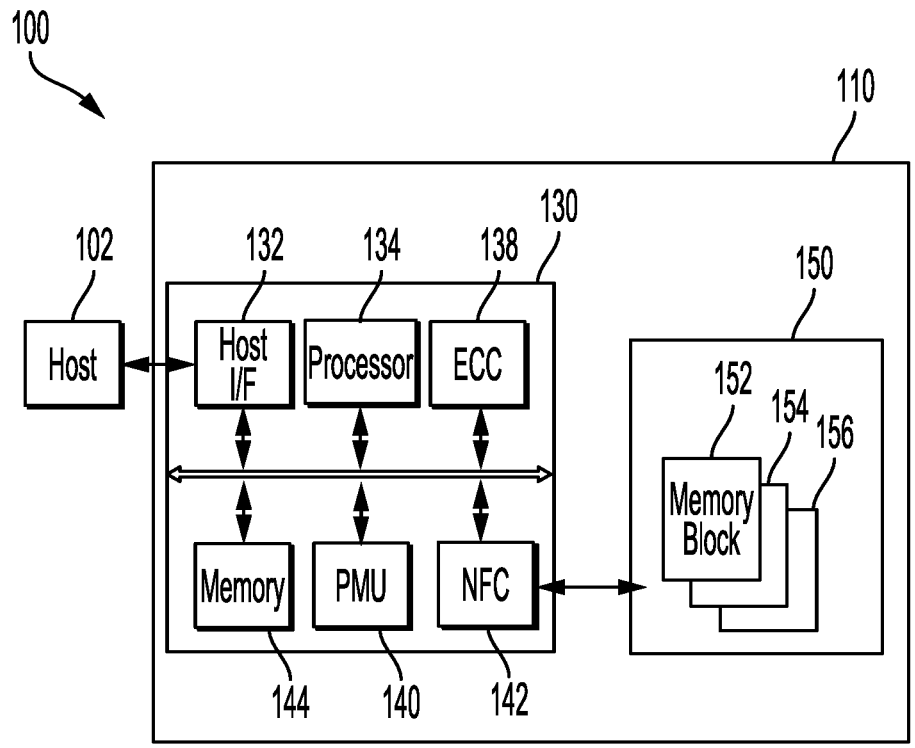
FIG. 1 is a block diagram illustrating a data processing system including a memory system in accordance with an embodiment of the present invention.

Memory may be used in a computing system organized as illustrated in FIG. 1. FIG. 1 illustrates a data processing system 100, such as may be included in a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels. The host device 102 may be, for example, a portable electronic device such as a mobile phone, an MP3 player, a laptop computer, or a non-portable electronic device such as a desktop computer, a game player, a television (TV), a media player, or a projector. Additional example host devices are illustrated and described with reference to FIG. 6.

The memory system 110 may execute operations in response to commands (e.g., a request) from the host device 102. For example, the memory system 110 may store data provided by the host device 102 and the memory system 110 may also provide stored data to the host device 102. The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

The memory system 110 may be implemented with any one of various storage devices, according to the protocol of a host interface for the one or more channels coupling the memory system 110 to the host device 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a controller 130 coupled to the memory module 150 through one or more channels. The memory module 150 may store and retrieve data in memory blocks 152, 154, and 156 under control of the controller 130, which may execute commands received from the host device 102. The controller 130 is configured to control data exchange between the memory module 150 and the host device 102. The storage components, such as blocks 152, 154, and 156 in the memory module 150 may be implemented as volatile memory device, such as, a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory.

The controller 130 and the memory module 150 may be formed as integrated circuits on one or more semiconductor dies (or other substrate). In some aspects, the controller 130 and the memory module 150 may be integrated into one chip. In some aspects, the memory module 150 may include one or more chips coupled in series or parallel with each other and coupled to the controller 130, which is on a separate chip. In some aspects, the memory module 150 and controller 130 chips are integrated in a single package, such as in a package on package (PoP) system. In some aspects, the memory system 110 is integrated on a single chip with one or more or all of the components (e.g., application processor, system memory, digital signal processor, modem, graphics processor unit, memory interface, input/output interface, network adaptor) of the host device 102, such as in a system on chip (SoC). The controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 of the memory system 110 may control the memory module 150 in response to commands from the host device 102. The controller 130 may execute read commands to provide the data from the memory module 150 to the host device 102. The controller 130 may execute write commands to store data provided from the host device 102 into the memory module 150. The controller 130 may execute other commands to manage data in the memory module 150, such as program and erase commands. The controller 130 may also execute other commands to manage control of the memory system 110, such as setting configuration registers of the memory system 110. By executing commands in accordance with the configuration specified in the configuration registers, the controller 130 may control operations of the memory module 150, such as read, write, program, and erase operations.

The controller 130 may include several components configured for performing the received commands. For example, the controller 130 may include a host interface (I/F) unit 132, a processor 134, an error correction code (ECC) unit 138, a power management unit (PMU) 140, a NAND flash controller (NFC) 142, and/or a memory 144. The power management unit (PMU) 140 may provide and manage power for components within the controller 130 and/or the memory module 150.

The host interface unit 132 may process commands and data provided from the host device 102, and may communicate with the host device 102, through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host interface 132 may be a parallel interface such as an MMC interface, or a serial interface such as an ultra-high speed class 1 (UHS-I)/UHS class 2 (UHS-II) or a universal flash storage (UFS) interface.

The ECC unit 138 may detect and correct errors in the data read from the memory module 150 during the read operation. The ECC unit 138 may not correct error bits when the number of the error bits is greater than a threshold number of correctable error bits, which may result in the ECC unit 138 outputting an error correction fail signal indicating failure in correcting the error bits. In some aspects, no ECC unit 138 may be provided or the ECC unit 138 may be configurable to be active for some or all of the memory module 150. The ECC unit 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The NFC 142 provides an interface between the controller 130 and the memory module 150 to allow the controller 130 to control the memory module 150 in response to a commands received from the host device 102. The NFC 142 may generate control signals for the memory module 150, such as signals for rowlines and bitlines, and process data under the control of the processor 134. Although NFC 142 is described as a NAND flash controller, other controllers may perform similar function for other memory types used as memory module 150.

The memory 144 may serve as a working memory of the memory system 110 and the controller 130. The memory 144 may store data for driving the memory system 110 and the controller 130. When the controller 130 controls an operation of the memory module 150 such as, for example, a read, write, program or erase operation, the memory 144 may store data which are used by the controller 130 and the memory module 150 for the operation. The memory 144 may be implemented with a volatile memory such as, for example, a static random access memory (SRAM) or a dynamic random access memory (DRAM). In some aspects, the memory 144 may store address mappings, a program memory, a data memory, a write buffer, a read buffer, a map buffer, and the like.

The processor 134 may control the general operations of the memory system 110, and a write operation or a read operation for the memory module 150, in response to a write request or a read request received from the host device 102, respectively. For example, the processor 134 may execute firmware, which may be referred to as a flash translation layer (FTL), to control the general operations of the memory system 110. The processor 134 may be implemented, for example, with a microprocessor or a central processing unit (CPU), or an application-specific integrated circuit (ASIC).

Figure 2:
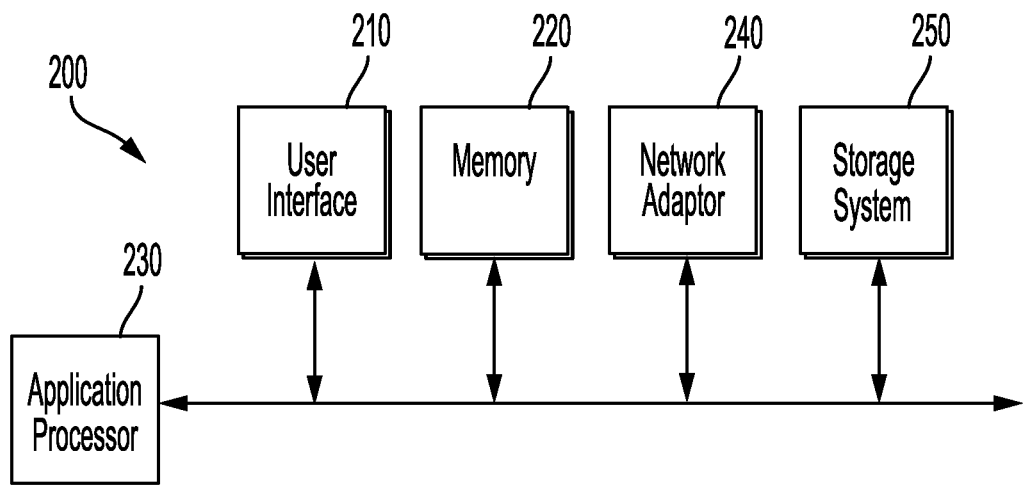
FIG. 2 is a block diagram illustrating an example electronic device including the memory system according to one or more aspects of the disclosure.

FIG. 2 is a block diagram illustrating an example electronic device including the memory system 100 according to one or more aspects of the disclosure. The electronic device 200 may include a user interface 210, a memory 220, an application processor 230, a network adaptor 240, and a storage system 250 (which may be one embodiment of the memory system 100 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (ReRAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other flash memory system.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMOLED) display device, a light emitting diode (LED), a speaker, or a haptic motor.

Figure 3:
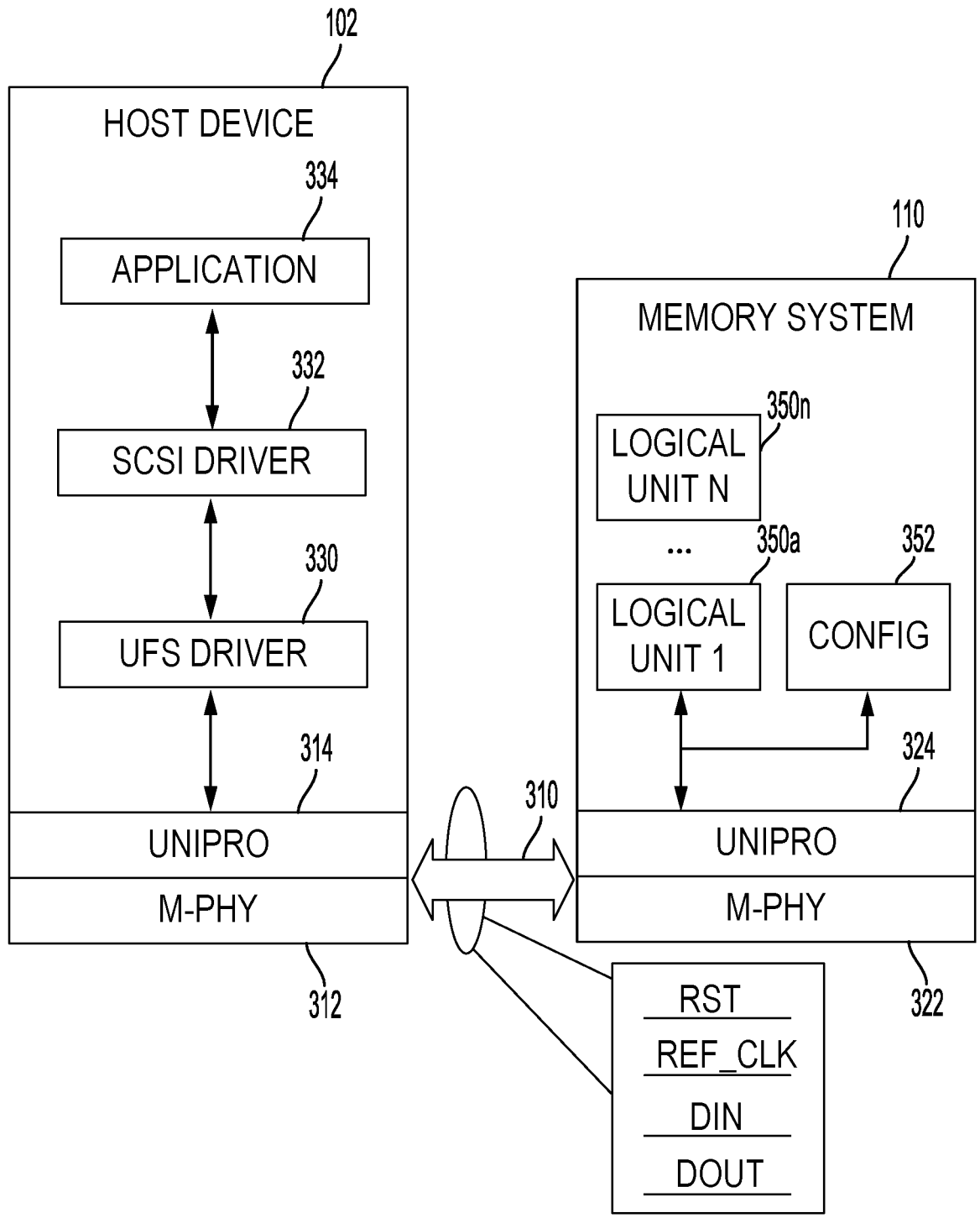
FIG. 3 is a block diagram illustrating components for facilitating access to a flash memory device from a host device according to some embodiments of the disclosure.

FIG. 3 is a block diagram illustrating components for facilitating access to a flash memory system from a host device according to some embodiments of the disclosure. The host device 102 accesses the memory system 110 through a memory interface 310. The host device 102 may include physical layer access block 312, which is configured to generate signals for output to the memory interface 310 and process signals received through the memory interface 310. The memory system 110 includes a similarly-configured physical layer access block 322 for communicating on the memory interface 310. One example physical layer specification for communicating on the memory interface 310 is the MIPI M-PHY™ physical layer specification.

The host device 102 also includes a data link layer block 314 configured to format frames of data for transmission on the memory interface 310. The frames may be provided to the physical layer access block 312 for transmission. The data link layer block 314 may receive frames from the physical layer access block 312 and decode frames of data received on the memory interface 310. The memory system 110 includes a similarly-configured data link layer block 324 for processing frames transmitted on or received on the memory interface 310 by the physical layer access block 322. One example data link protocol for communicating on a MIPI M-PHY™ physical link is the MIPI UNIPRO™ specification.

The memory system 110 includes N logical units 350*a-n* comprising logical memory blocks for storing information including user data (e.g., user documents, application data) and configuration data (e.g., information regarding operation of the memory system 110). The logical units 350*a-n* may map to portions of the physical memory blocks 152, 154, and 156. Some of the logical units 350*a-n* or portions of the logical units 350*a-n* may be configured with write protection, with boot capability, as a specific memory type (e.g., default, system code, non-persistent, enhanced), with priority access, or with replay protection as a replay protected memory block (RPMB). The physical layer access block 322 and the data link layer block 324 perform operations of a memory controller for the memory system 110 for storing and retrieving data in logical units 350*a-n*.

The memory system 110 also includes configuration structures 352. The configuration structures 352 may include information such as latency values, latency threshold values, and/or capability flags indicating whether latency mitigation is supported and/or types of latency mitigation is supported. For example, the configuration structure 352 may include a flag indicating whether the memory system 110 supports packed commands.

The host device 102 may be configured to execute one or more applications 334, such as user applications executed by an operating system under the control of a user to receive user input and provide information stored in the memory system 110 to the user. The host device 102 may include several components for interfacing the application 334 to the memory system 110 through the memory interface 310. For example, a SCSI driver 332 and a UFS driver 330 may interface the application 334 to a host memory controller that includes the data link layer block 314 and the physical layer access block 312. The SCSI driver 332 may execute at an application layer for handling transactions requested by the application 334 with the memory system 110. The UFS driver 330 may execute at a transport layer and manage operation of the data link layer block 314, such as to operate the memory interface 310 at one of a plurality of modes of operations. The modes of operations may include two or more gear settings, such as one or more PWM-GEAR settings and four or more HS-GEAR settings specifying one bitrate from 182 MBps, 364 MBps, 728 MBps, and 1457 MBps.

The memory interface 310 may include one or more lines including a reset RST line, a reference clock REF_CLK line, a data-in DIN line (for data transmissions from the host device 102 to the memory system 110), and a data-out DOUT line (for data transmissions from the memory system 110 to the host device 102). The DIN and DOUT lines may be two separate conductors, or the DIN and DOUT lines may include multiple conductors. In some embodiments, the DIN and DOUT lines may be asymmetric with the DIN line including N conductors and the DOUT line including M conductors, with N>M or M>N.

The UFS driver 330 may generate and decode packets to carry out transactions requested by the application 334. The packets are transmitted over the memory interface 310. The packets may be formatted as UFS Protocol Information Units (UPIUs). In a transaction with the memory system 110, the host device 102 is an initiator and the memory system 110 is a target. The UFS driver 330, based on the type of transaction, may form one of several types of UPIUs for handling SCSI commands, data operations, task management operations, and/or query operations. Each transaction may include one command UPIU, zero or more DATA IN or DATA OUT UPIUs, and a response UPIU. Each UPIU may include a header followed by optional fields depending on the type of UPIU.

One example transaction is a read operation. A read transaction may include the initiator (e.g., host device 102) transmitting a command UPIU for causing the target (e.g., memory system 110) to perform a read operation requested by the application 334. The target provides one or more DATA IN UPIUs in response to the command UPIU, in which the DATA IN UPIUs include the requested data. The read transaction is completed by the target transmitting a Response UPIU.

Another example transaction is a write operation. A write operation may include the initiator (e.g., host device 102) transmitting a command UPIU for causing the target (e.g., memory system 110) to perform a write operation requested by the application 334. The target provides a Ready to Transfer UPIU signaling the initiator to begin transfer of write data. The initiator then transmits one or more DATA OUT UPIUs, which are followed by a Ready to Transfer UPIU signaling the initiator to continue transfer of the write data. The sequence of DATA OUT UPIUs and Ready to Transfer UPIU continues until all write data is provided to the target, after which the target provides a Response UPIU to the initiator.

A further example transaction is a query operation. A query operation may include the initiator (e.g., host device 102) requesting information about the target (e.g., memory system 110). The initiator may transmit a Query Request UPIU to request information such as configuration, enumeration, device descriptor, flags, and/or attributes of the target. Example query operations includes read descriptor, write descriptor, read attribute, write attribute, read flag, set flag, clear flag, and/or toggle flag. Example descriptors include device, configuration, unit, interconnect, string, geometry, power, and/or device health. Example flags include fDeviceInit, fPermanenetWPEn, fPowerOnWPEn, fBackgroundOpsEn, fDeviceLifeSpanModeEn, fPurgeEnable, fRefreshEnable, fPhyResourceRemoval, fBusyRTC, and/or fPermanentlyDisableFwUpdate. Example attributes include bBootLunEn, bCurrentPowerMode, bActiveIC-CLevel, bOutOfORderDataEn, bBackgroundOpStatus, bPurgeStatus, bMaxDataInSize, bMaxDataOutSize, dDynCapNeeded, bRefClkFreq.

Figure 4A:
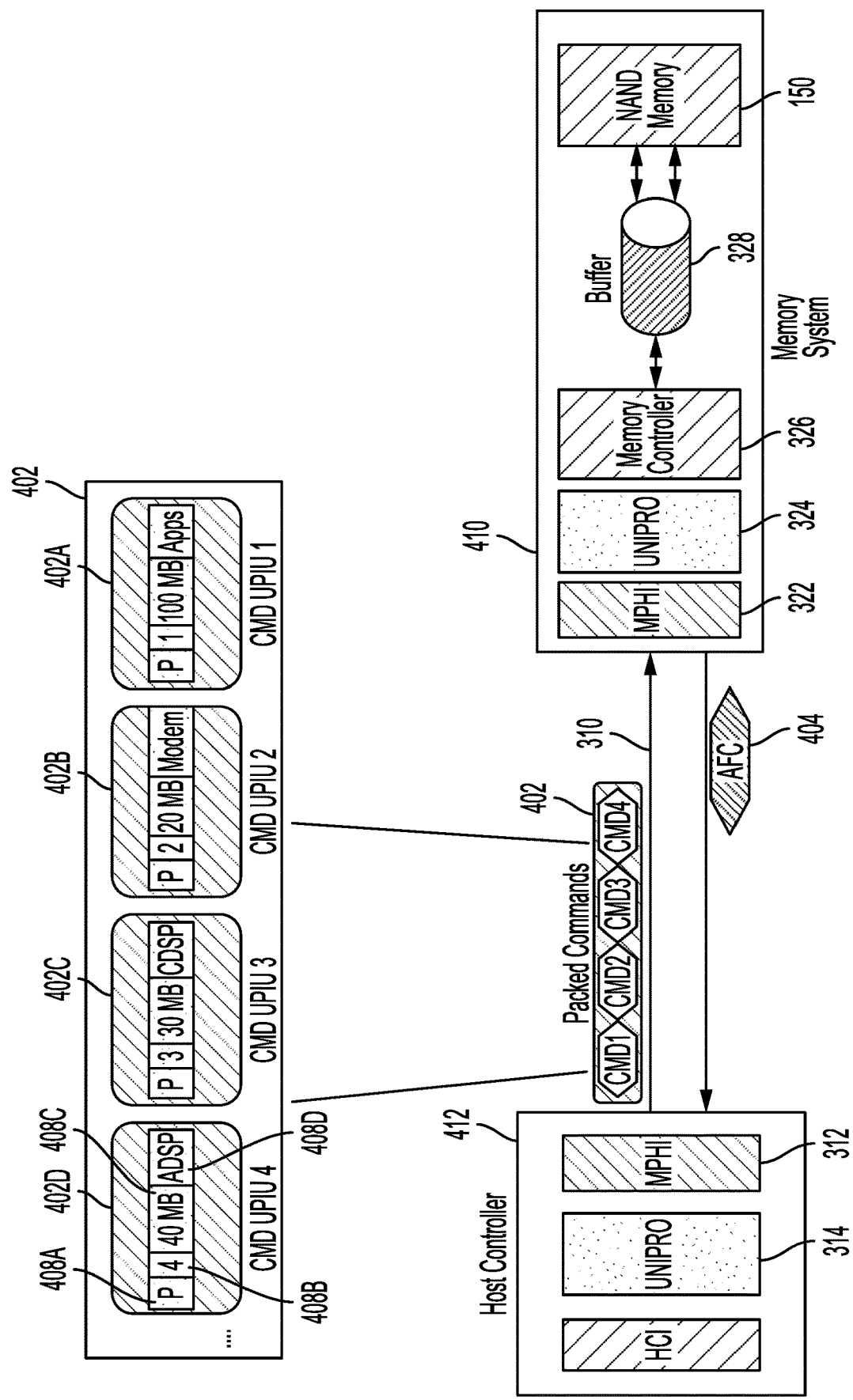
FIG. 4A is a block diagram illustrating a packed command structure for executing operations on a flash memory device according to some embodiments of the disclosure.

The operations and capabilities described above may be used for processing packed transmissions, which may include a packed command including many commands packaged together in a single packet. An example packed command operation is shown in FIG. 4A. Packets transmitted over the memory interface 310 may include a packed command 402, which includes two or more commands. Operation of a memory system 410 using packed command may mitigate acknowledgement frame (AFC) latency. When the packed command 402 is received at the memory system 410, the memory system 410 transmits a single acknowledgement frame (AFC) 404 corresponding to all of the commands received in the packed command 402.

Latency measured by a host controller 412 between transmitting a packet and receiving an AFC may be due to delays in the memory interface 310 and due to processing in the memory system 410. When a packet is received at the memory system 410, the signals are processed through the physical layer access block 322, the data link layer block 324, and the memory controller 326 for storage in a buffer 328. The buffer 328 may be NAND memory. The memory controller 326 then instructions the transmission of an acknowledgement frame AFC on the memory interface 310 through the data link layer block 324 and the physical layer access block 322. Aging of the buffer 328 may increase delays in processing a command, which results in an increased latency experienced by the host controller 412 for receiving the AFC. When only a single command is transmitted, the delay in AFC slows down the transmission of commands because a subsequent command may be held until the AFC is received. Transmitting multiple commands in packed command 402 reduces the number of AFCs transmitted by the memory system 410, allowing a single AFC to acknowledge two or more commands.

The packed command 402 may include a plurality of Command UPIUs 402A-D. Each of the UPIUs 402A-D may include a header portion including a first field 408A and a second field 408B. The first field 408A may include a flag indicating the UPIU is part of a packed command. The second field 408B may include a value indicating a sequence number of the UPIU within the packed command 402. Each of the UPIUs may further include the payload data length 408C and metadata 408D. An example Command UPIU with the first field 408A and second field 408B is shown in the table below:

| Byte | Contents |
| --- | --- |
| 0 | xx000001b |
| 1 | Flags |
| 2 | LUN |
| 3 | Task Tag |
| 4 | IID \| Command Set Type |
| 5 | Packed Command Sequence Number (e.g., the second field 408B) |
| 6 | Packed Command Indicator (e.g., the first field 408A) |
| 7 | EXT_IID \| Reserved |
| 8 | Total EHS Length |
| 9 | Reserved |
| 10-11 | Data Segment Length |
| 12-15 | Expected Data Transfer Length |
| 16-31 | Command Descriptor Block (CDB) |

When the packed command 402 includes write operations, the packed command 402 may be followed by a Ready to Transfer UPIU from the memory system 410 and subsequently a Packed Data Out UPIU to the memory system 410. The Packed Data Out UPIU may include a plurality of Data Out UPIUs. Each Data Out UPIU may include a header portion including a first field and a second field, which may be similarly structured to the fields 408A and 408B of the Command UPIU to include information regarding the relation of Data Out UPIUs in a Packed Data Out UPIU. An example Data Out UPIU is shown in the table below:

| Byte | Contents |
| --- | --- |
| 0 | xx000010b |
| 1 | Flags |
| 2 | LUN |
| 3 | Task Tag |
| 4 | IID \| Command Set Type |
| 5 | Packed Data Out Sequence Number |
| 6 | Packed Data Out Indicator |
| 7 | EXT_IID \| Reserved |
| 8 | Total EHS Length |
| 9 | Reserved |
| 10-11 | Data Segment Length |
| 12-15 | Data Buffer Offset |
| 16-19 | Data Transfer Count |
| 20-31 | Reserved |
| K . . . k + Length − 1 | Data[0] . . . Data[Length − 1] |

When the packed command 402 includes read operations, the packed command 402 may be followed by a Packed Data In UPIU from the memory system 410 to the host controller 412, which includes a plurality of Data In UPIUs. Each Data In UPIU may include a header portion including a first field and a second field, which may be similarly structured to the fields 408A-B of the Command UPIU to include information regarding the relation of Data In UPIUs in a Packed Data In UPIU. An example Data In UPIU is shown in the table below:

| Byte | Contents |
| --- | --- |
| 0 | xx100010b |
| 1 | Flags |
| 2 | LUN |
| 3 | Task Tag |
| 4 | IID \| Reserved |
| 5 | EXT_IID \| Reserved |
| 6 | Packed Data In Sequence Number |
| 7 | Packed Data In Indicator |
| 8 | Total EHS Length |
| 9 | Reserved |
| 10-11 | Data Segment Length |
| 12-15 | Data Buffer Offset |
| 16-19 | Data Transfer Count |
| 20 | Reserved \| HintControl |
| 21 | HintEXT_IID \| HintIID |
| 22 | HintLUN |
| 23 | HintTaskTag |
| 24-27 | Hint Data Buffer Offset |
| 28-31 | Hint Data Count |
| k . . . k + Length − 1 | Data[0] . . . Data[Length − 1] |

A Packed Response UPIU may be transmitted to acknowledge receipt of a Packed Data Out UPIU. The Packed Data Response UPIU may acknowledge receipt of a last sequence number in the corresponding Data Out UPIU. An Example Packed Data Response UPIU is shown in the table below:

| Byte | Contents |
| --- | --- |
| 0 | xx100001b |
| 1 | Flags |
| 2 | LUN |
| 3 | Task Tag |
| 4 | IID \| Reserved |
| 5 | EXT_IID \| Reserved |
| 6 | Response |
| 7 | Status |
| 8 | Total EHS Length |
| 9 | Device Information |
| 10-11 | Data Segment Length |
| 12-15 | Residual Transfer Count |
| 16 | Reserved |

-continued

| Byte | Contents |
|---|---|
| 17 | Last Sequence Number of Packed Data Out UPIU |
| 18-31 | Reserved |
| k . . . k + 1 | Sense Data Length |
| k + 2 . . . k + 19 | Sense Data[0] . . . Sense Data [17] |

Figure 4B:
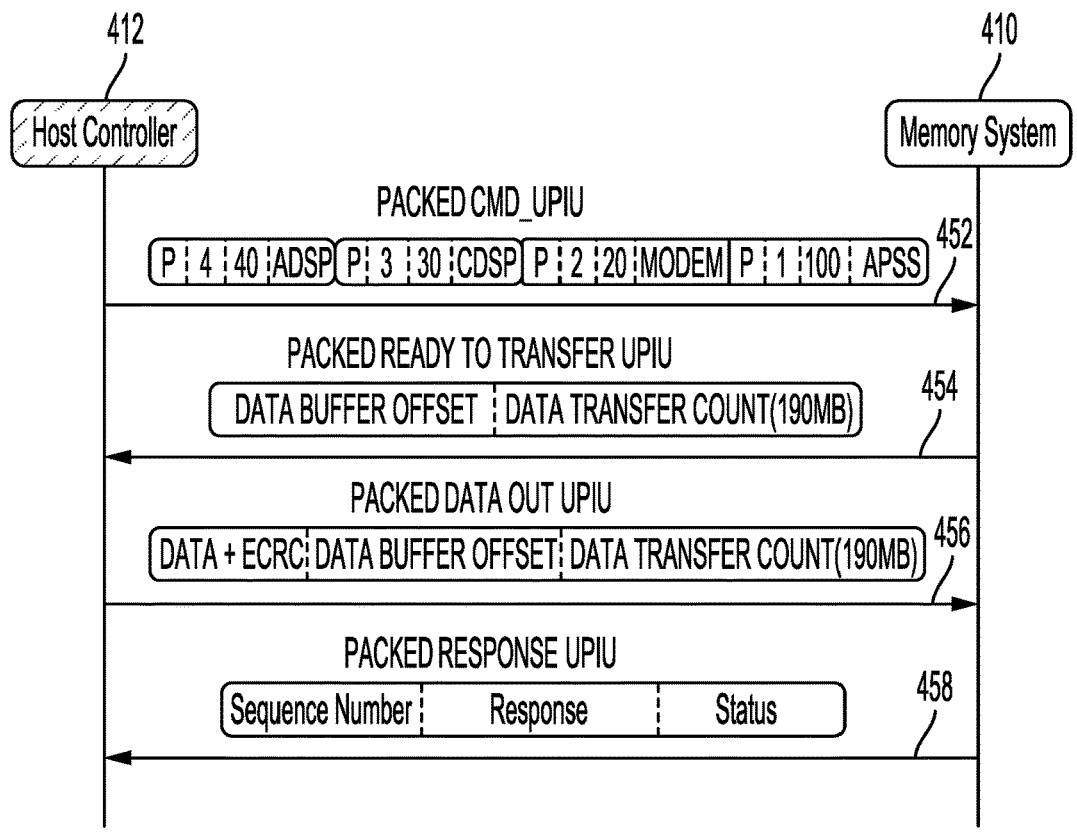
FIG. 4B is a call diagram illustrating a Packed Data Out UPIU transfer flow according to some embodiments of the disclosure.

A sequence of transmissions on the memory interface 310 for a write operation using packed transmissions as described above is shown in FIG. 4B. FIG. 4B is a call diagram illustrating a Packed Data Out UPIU transfer flow according to some embodiments of the disclosure. A host controller 412 initiates the operation by transmitting 452 a Packed Command UPIU comprising a packed command of a plurality of commands. The memory system 410 responds by transmitting 454 a Packed Ready to Transfer UPIU when the memory system 410 is ready to receive the data for writing to memory blocks. The host controller 412 proceeds by transmitting 456 a Packed Data Out UPIU including the data for writing to memory blocks. The memory system 410 responds by transmitting 458 a Packed Response UPIU acknowledged receipt of the data in the Packed Data Out UPIU.

Figure 4C:
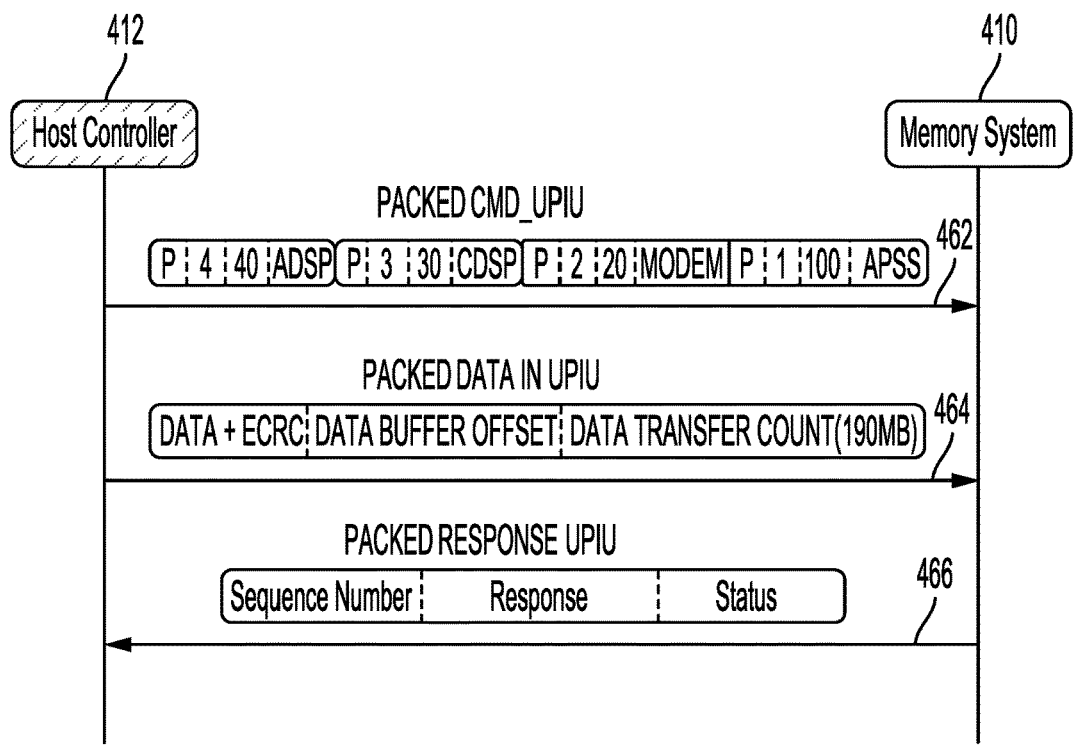
FIG. 4C is a call diagram illustrating a Packed Data In UPIU transfer flow according to some embodiments of the disclosure.

A sequence of transmissions on the memory interface 310 for a read operation using packed structures as described above is shown in FIG. 4C. FIG. 4C is a call diagram illustrating a Packed Data In UPIU transfer flow according to some embodiments of the disclosure. A host controller 412 initiates the operation by transmitting 462 a Packed Command UPIU comprising a packed command of a plurality of commands. The memory system 410 responds by transmitting 464 a Packed Data In UPIU including the data read from the memory blocks. The memory system 410 completes the operation by transmitting 466 a Packed Response UPIU.

The use of packed commands for accessing the memory system may be activated based on one or more rules. For example, packed transmissions may only be used to communicate with a memory system when the memory system supports packed transmissions indicated by device information retrieved from the memory system. As another example, packed transmissions may only be used when a flash device performance meets a certain threshold, such as when a AFC latency exceeds a threshold value. An example application of AFC latency mitigation procedures is shown in FIG. 4D.

Figure 4D:
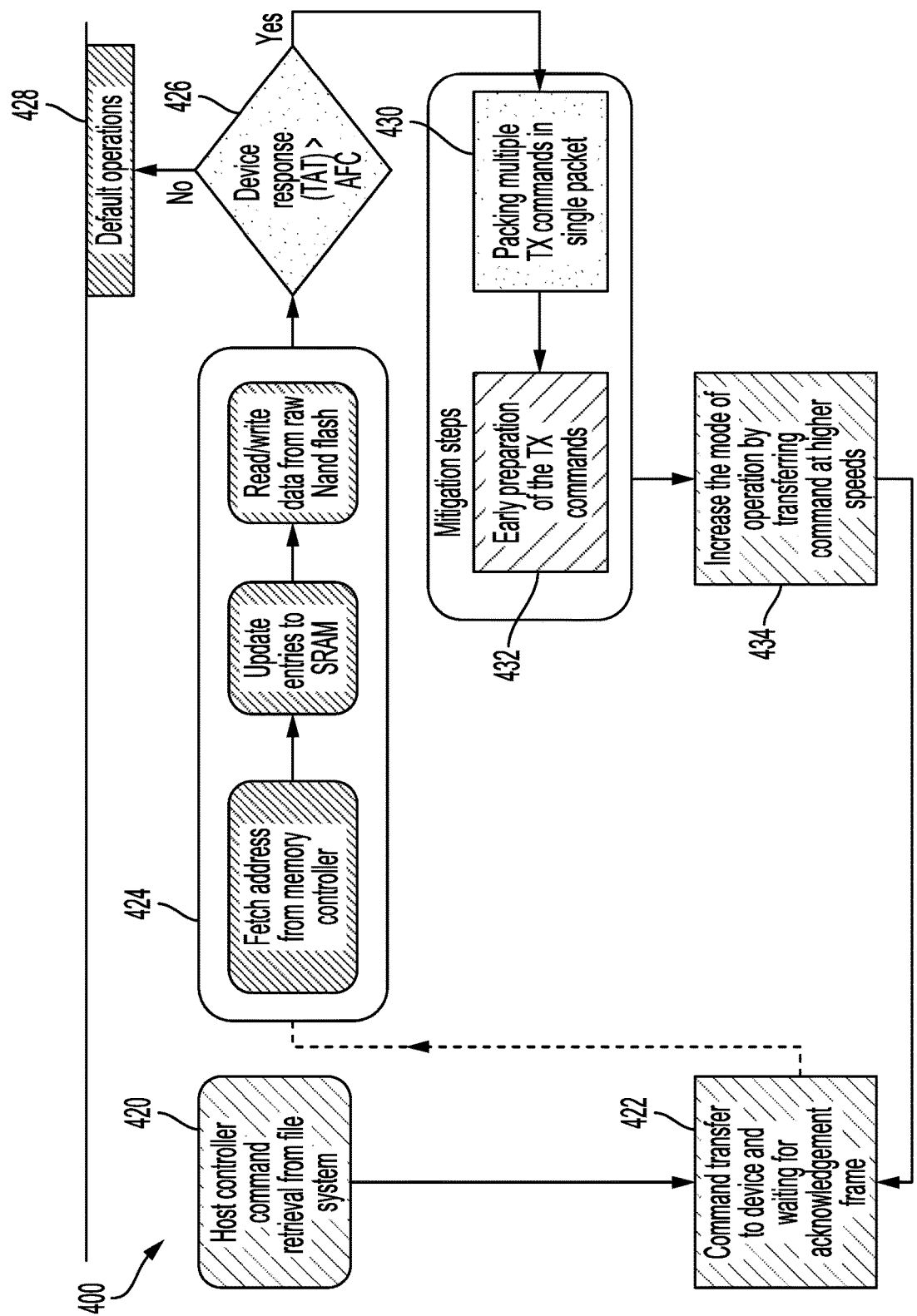
FIG. 4D is a flow chart illustrating a method of communicating with a flash device using packed commands according to some embodiments of the disclosure.

FIG. 4D is a flow chart illustrating a method of communicating with a memory system using packed commands according to some embodiments of the disclosure. A method 400 begins at block 420 with the host controller commanding a retrieval from a file system. At block 422, the host controller transmits a command to the memory system and waits for an acknowledgement frame. The command causes the operations of block 424 including fetching an address from a memory controller, updating mapping entries in SRAM of the memory controller, and reading/writing data from memory blocks coupled to the memory controller. At block 426, the device response time (TAT) is compared to the AFC. If the TAT is less than the AFC then default operations without packed transmissions are performed at block 428. In some embodiments, if the AFC frame from the flash device is delayed (which may be confirmed by checking the AFC frame time stamp field indicating a time at which flash device places the AFC frame on the interface) and if the delay is more than an expected widow-size then the host controller may determine the latency is AFC latency, which may be due to aging factors when the flash device gets older.

If the TAT is greater than the AFC then mitigation steps for reducing the latency experienced by the host controller are implemented. For example, at block 430, multiple commands may be combined in a packed command and transmitting in a single packet to the memory system. As another example, the host controller may implement early preparation of transmission commands at block 432. After implementing mitigation steps of blocks 430 and/or 432, the host controller may, at block 434, increase the mode of operation of the memory system by increasing the mode of operation by transferring the packed command at a higher speed on the interface (e.g., by increasing a gear setting).

Figure 4E:
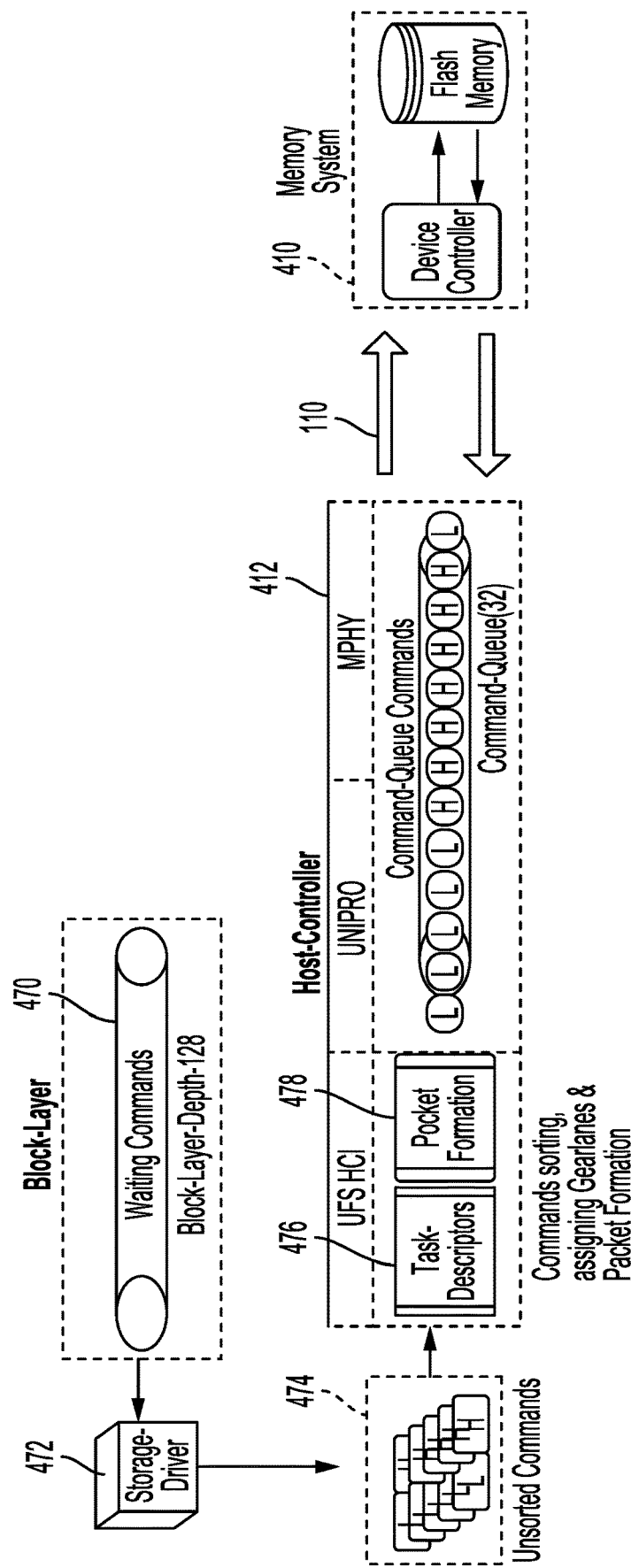
FIG. 4E is a block diagram illustrating forming a packed command with prioritization according to some embodiments of the disclosure.

When packing commands, the host controller 412 may apply one of many potential algorithms for selecting commands for inclusion in the packed command. FIG. 4E is a block diagram illustrating forming a packed command with prioritization according to some embodiments of the disclosure. Commands 470 may be received by a storage driver 472 executing on the host device. The commands 470 may be queued from one or more applications executing on the host device and interfacing with the storage driver 472 through an operating system. The storage driver assembles unsorted commands 474 that are transferred through an interface between the application processor executing the storage driver 472 and the host controller 412.

The host controller 412 may apply task descriptors 476 to the commands for selecting commands for the packed command. The task descriptors may be based on the nature of the commands. Gear lines may be assigned by the host controller 412, and the commands may be sorted before the commands are entered into a command queue. The task descriptors may, for example, classify commands as high priority or low priority. Conventionally, each command is individually transmitted to the memory system 410 and acknowledged by the memory system 410. In aspects of this disclosure, commands may be packed into a packet-by-packet formation block 428 for entry into the command queue, in which a packed command is then transmitted over the memory interface 310 to the memory system 410. The memory system 410 may thus acknowledge several commands with a single acknowledgement. The host controller 412 may prioritize high priority commands to inclusion in a packed command.

The packet formation block 478 may operate based on configuration parameters specified by the storage driver 472. The configuration parameters may specify a number of command slots in a packed command for a fixed packed command size or a maximum number of command slots in a packed command for a dynamic packed command size. The configuration parameters may specify a cut-off threshold specifying a minimum number of commands to include in a packed command. When the minimum number of commands is received in the command queue then the host controller 412 may transmit a packed command with those commands. The configuration parameters may specify a wait threshold indicating an amount of time the host controller 412 can hold commands in the command queue before transmitting a packet with the packed command. The configuration parameters may specify a packet size (e.g., 16 or half of CQ length). The configuration parameters may specify a number of sub-packets that can be divided to facilitate high priority packets during a mixed load condition.

Figure 5:
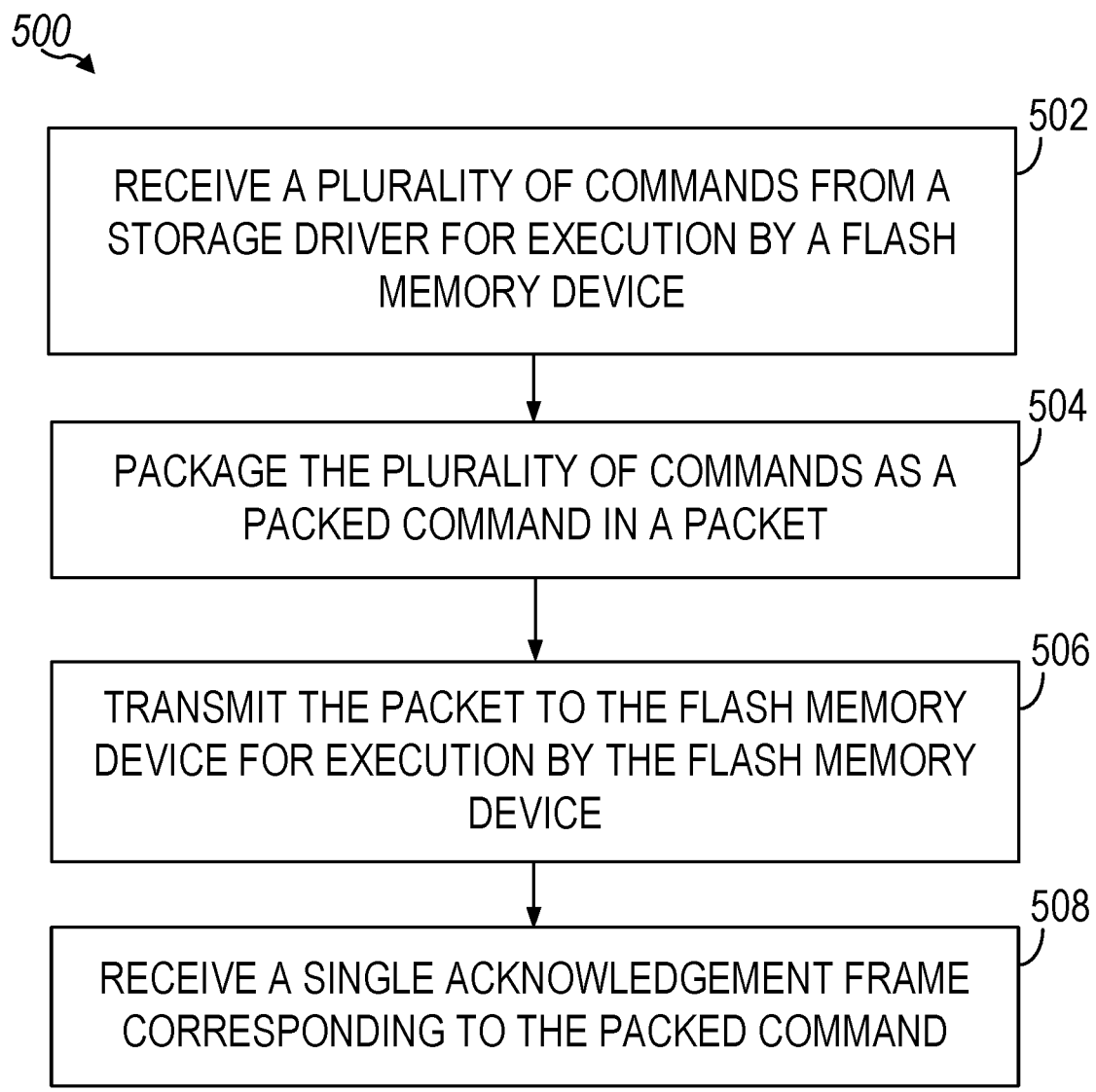
FIG. 5 is a flow chart illustrating a method for preparing a packed command by a host controller according to some embodiments of the disclosure.

FIG. 5 is flow chart illustrating a method for executing a packed command by a host controller according to some embodiments of the disclosure. A method 500 includes, at block 502, receiving, by the memory controller of a host device, a plurality of commands from a storage driver for execution by a flash memory device. At block 504, the memory controller packages the plurality of commands as a packed command in a packet. The packaging may include determining priorities of received commands and ordering them for inclusion in the packed command. At block 506, the memory controller transmits the packet comprising the packed command for execution by the flash memory device. At block 508, the memory controller receives a single acknowledgement frame (AFC) corresponding to the packed command of block 506. The AFC may indicate a last sequence number of commands in the packed command transmitted at block 506. The AFC may alternatively indicate a number of commands in the packed command transmitted at block 506. Subsequent to receiving the acknowledgement, the memory controller may process (e.g., transmit or receive) additional packed transmissions to complete operations corresponding to the plurality of commands in the packed command, such as by transmitting and/or receiving a Packed Data Out UPIU and/or Packed Data In UPIU.

Figure 6:
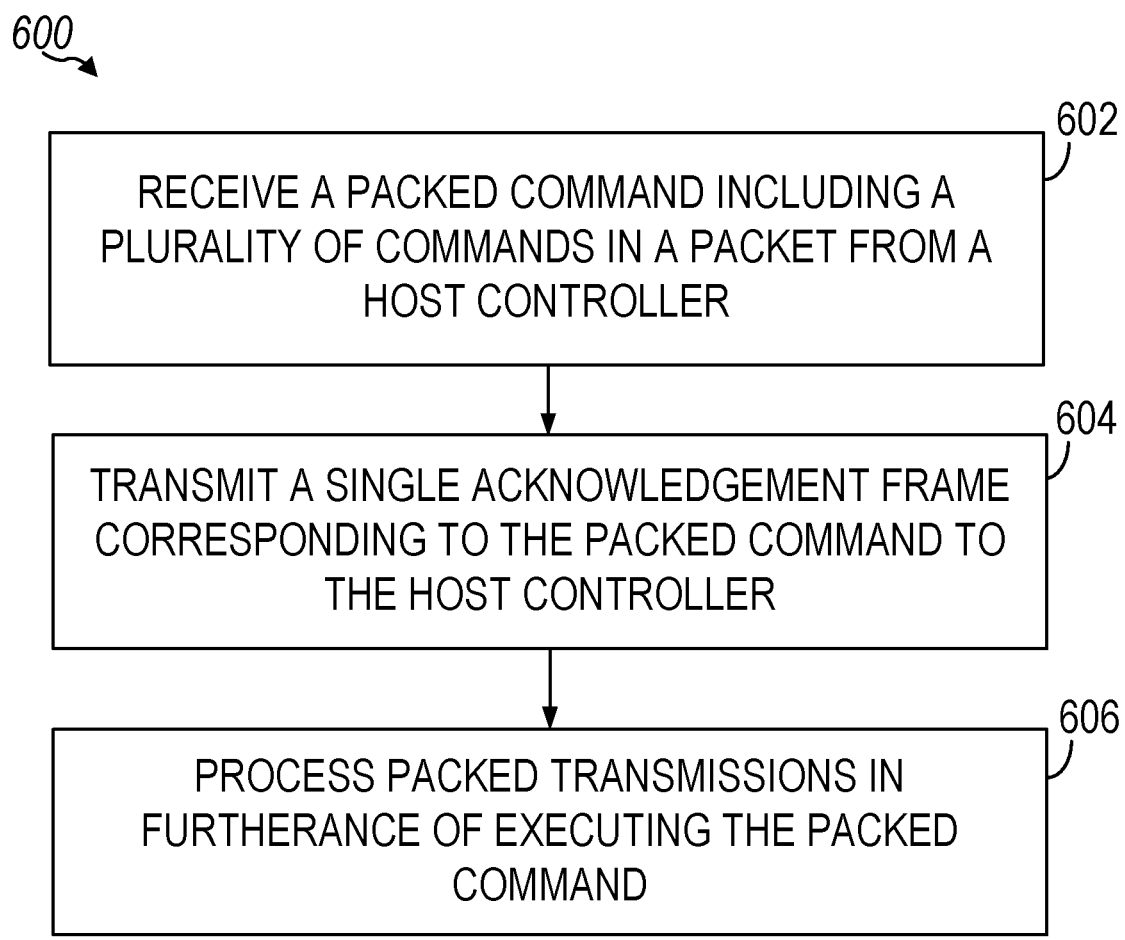
FIG. 6 is a flow chart illustrating a method for processing a packed command by a flash memory device according to some embodiments of the disclosure.

FIG. 6 is a flow chart illustrating a method for processing a packed command by a flash memory system according to some embodiments of the disclosure. A method 600 includes, at block 602, receiving, from a host device, a packed command in a packed command packet, the packed command comprising a plurality of commands. At block 604, the memory system may transmit, to the host device, a single acknowledgment frame (AFC) corresponding to the plurality of commands after receiving the packed command packet. At block 606, the memory system may process (e.g., transmit or receive) additional packed transmissions in furtherance of the operations to execute the plurality of commands, such as transmitting and/or receiving a Packed Data Out UPIU and/or Packed Data In UPIU.

Figure 7:
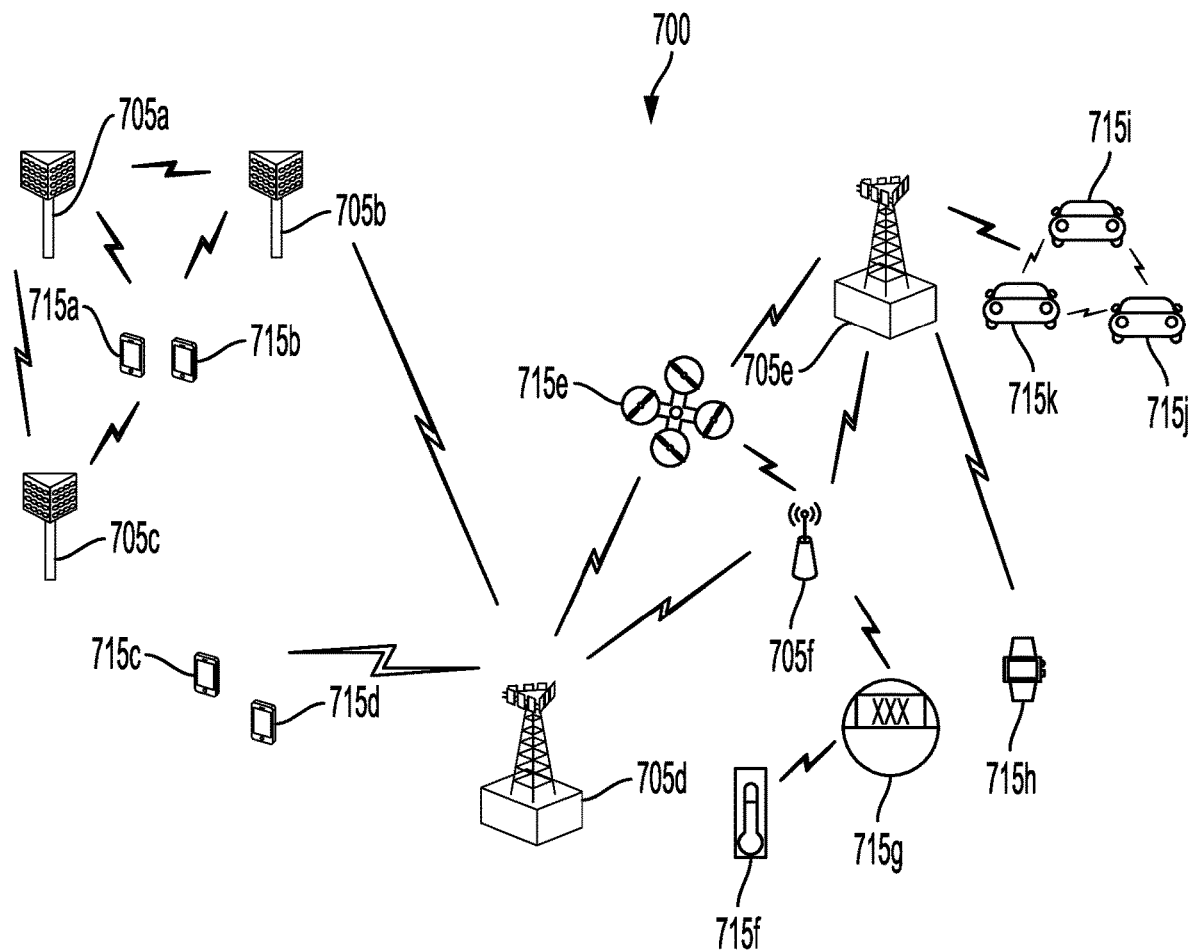
FIG. 7 is a block diagram illustrating details of an example wireless communication system according to one or more aspects.

Operations of method 500 or method 600 may be performed by a UE, such as a UE described with reference to FIG. 7. For example, example operations (also referred to as "blocks") of method 500 or method 600 may enable UE 615 to support greater user data confidentiality. FIG. 7 is a block diagram illustrating details of an example wireless communication system according to one or more aspects. The wireless communication system may include wireless network 700. Wireless network 700 may, for example, include a 5G wireless network. As appreciated by those skilled in the art, components appearing in FIG. 7 are likely to have related counterparts in other network arrangements including, for example, cellular-style network arrangements and non-cellular-style-network arrangements (e.g., device to device or peer to peer or ad hoc network arrangements, etc.).

Wireless network 700 illustrated in FIG. 7 includes a number of base stations 705 and other network entities. A base station may be a station that communicates with the UEs and may also be referred to as an evolved node B (eNB), a next generation eNB (gNB), an access point, and the like. Each base station 705 may provide communication coverage for a particular geographic area. In 3GPP, the term "cell" may refer to this particular geographic coverage area of a base station or a base station subsystem serving the coverage area, depending on the context in which the term is used. In implementations of wireless network 700 herein, base stations 705 may be associated with a same operator or different operators (e.g., wireless network 700 may include a plurality of operator wireless networks). Additionally, in implementations of wireless network 700 herein, base station 705 may provide wireless communications using one or more of the same frequencies (e.g., one or more frequency bands in licensed spectrum, unlicensed spectrum, or a combination thereof) as a neighboring cell. In some examples, an individual base station 705 or UE 715 may be operated by more than one network operating entity. In some other examples, each base station 705 and UE 715 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 7, base stations 705d and 705e are regular macro base stations, while base stations 705a-705c are macro base stations enabled with one of 3 dimension (3D), full dimension (FD), or massive MIMO. Base stations 705a-705c take advantage of their higher dimension MIMO capabilities to exploit 3D beamforming in both elevation and azimuth beamforming to increase coverage and capacity. Base station 705f is a small cell base station which may be a home node or portable access point. A base station may support one or multiple (e.g., two, three, four, and the like) cells.

Wireless network 700 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 715 are dispersed throughout the wireless network 700, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 715, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a flying device, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 715a-715d of the implementation illustrated in FIG. 7 are examples of mobile smart phone-type devices accessing wireless network 700. A UE may also be a machine specifically configured for connected communication, including machine type communication (MTC), enhanced MTC (eMTC), narrowband IoT (NB-IoT) and the like. UEs 715e-715k illustrated in FIG. 7 are examples of various machines configured for communication that access wireless network 700.

A mobile apparatus, such as UEs 715, may be able to communicate with any type of the base stations, whether macro base stations, pico base stations, femto base stations, relays, and the like. In FIG. 7, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 700 may occur using wired or wireless communication links.

In operation at wireless network 700, base stations 705a-705c serve UEs 715a and 715b using 3D beamforming and coordinated spatial techniques, such as coordinated multipoint (CoMP) or multi-connectivity. Macro base station 705d performs backhaul communications with base stations 705a-705c, as well as small cell, base station 705f. Macro base station 705d also transmits multicast services which are subscribed to and received by UEs 715c and 715d. Such multicast services may include mobile television or stream video, or may include other services for providing community information, such as weather emergencies or alerts, such as Amber alerts or gray alerts.

Wireless network 700 of implementations supports mission critical communications with ultra-reliable and redundant links for mission critical devices, such UE 715e, which is a aeronautical vehicle. Redundant communication links with UE 715e include from macro base stations 705d and 705e, as well as small cell base station 705f. Other machine type devices, such as UE 715f (thermometer), UE 715g (smart meter), and UE 715h (wearable device) may communicate through wireless network 700 either directly with base stations, such as small cell base station 705f, and macro base station 705e, or in multi-hop configurations by communicating with another user device which relays its information to the network, such as UE 715f communicating temperature measurement information to the smart meter, UE 715g, which is then reported to the network through small cell base station 705f. Wireless network 700 may also provide additional network efficiency through dynamic, low-latency TDD communications or low-latency FDD communications, such as in a vehicle-to-vehicle (V2V) mesh network between UEs 715i-715k communicating with macro base station 705e.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. The various different network types may use different radio access technologies (RATs) and RANs.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In one or more aspects, techniques for supporting data storage and/or data transmission, may include additional aspects, such as any single aspect or any combination of aspects described below or in connection with one or more other processes or devices described elsewhere herein. In a first aspect, an electronic device, such as a UE, may be an apparatus as a host device that includes a memory controller configured to couple to an interface to a memory system, in which the memory system may be integrated with the host device or externally coupled to the host device. The memory system may include a memory controller coupled to a memory system through a first channel and configured to access data stored in the memory system through the first channel and coupled to a host device through a memory interface and configured to communicate with the host device over the memory interface. The operations may be executed as part of an initialization operation, a read operation or a write operation.

In a first aspect, the memory controller of the memory system may be configured to perform operations including receiving, from the host device, a packed command in a packed command packet, the packed command comprising a plurality of commands; and transmitting, to the host device, an acknowledgment frame corresponding to the plurality of commands after receiving the packed command packet.

In a second aspect, in combination with the first aspect, the packed command packet comprises a packed command universal flash storage (UFS) Protocol Information Unit (UPIU), and the operations further including determining a plurality of command UFS Protocol Information Units (UPIUs) corresponding to the plurality of commands from the packed command packet.

In a third aspect, in combination with one or more of the first aspect or the second aspect, determining the plurality of command UPIUs comprises determining a first field in a header of each of the plurality of command UPIUs indicates each of the plurality of command UPIUs is part of the packed command; and determining a sequence of the plurality of command UPIUs based on a second field in a header of each of the plurality of command UPIUs.

In a fourth aspect, in combination with one or more of the first aspect through the third aspect, determining the first field in a header of each of the plurality of command UPIUs indicates each of the plurality of command UPIUs is part of the packed command comprises determining a sixth byte of the header comprises a packed flag; and determining the sequence comprises determining the sequence based on a fifth byte of the header.

In a fifth aspect, in combination with one or more of the first aspect through the fourth aspect, the operations further include receiving, from the host device, a query request for information regarding a capability of the memory controller; and transmitting, to the host device, a response indicating the capability of the memory controller supports packed commands.

In a sixth aspect, in combination with one or more of the first aspect through the fifth aspect, the memory controller of the host device may be configured to perform operations including receiving, by the memory controller of a host device, a plurality of commands from a storage driver for execution by a flash memory device; packaging, by the memory controller of the host device, the plurality of commands as a packed command in a packet; and transmitting, by the memory controller of the host device to the flash memory device, the packet comprising the packed command for execution by the flash memory device.

In a seventh aspect, in combination with one or more of the first aspect through the sixth aspect, the packet comprises a packed command universal flash storage (UFS) Protocol Information Unit (UPIU) comprising a plurality of command UFS Protocol Information Units (UPIUs) corresponding to the plurality of commands.

In an eighth aspect, in combination with one or more of the first aspect through the seventh aspect, packaging the plurality of commands comprises inserting a first field in a header of each of the plurality of command UPIUs indicating each of the plurality of command UPIUs is part of the packed command; and inserting a second field in a header of each of the plurality of command UPIUs indicating a sequence number for each of the plurality of command UPIUs in relation to each other of the plurality of command UPIUs.

In a ninth aspect, in combination with one or more of the first aspect through the eighth aspect, the operations further include determining a command acknowledgement delay for the memory system, wherein the operation of packaging the plurality of commands as the packed command is based on the command acknowledgement delay satisfying a criteria.

In a tenth aspect, in combination with one or more of the first aspect through the ninth aspect, the operations include increasing a mode of operation for the memory interface after determining the command acknowledgement delay satisfies the criteria, wherein the operation of transmitting the packed command comprising the packed command is performed on the memory interface after increasing the mode of operation.

In an eleventh aspect, in combination with one or more of the first aspect through the tenth aspect, the operations include determining a second command acknowledgement delay for the memory system; and when the second command acknowledgement delay satisfies a second criteria, transmitting a second plurality of commands in a plurality of packets for execution by the flash memory device.

In a twelfth aspect, in combination with one or more of the first aspect through the eleventh aspect, the operation of packaging the plurality of commands as the packed command is based on the command acknowledgement delay exceeding a predetermined threshold.

In a thirteenth aspect, in combination with one or more of the first aspect through the twelfth aspect, the operations further include applying, by the memory controller of the host device, task descriptors to the plurality of commands; and prioritizing a first subset of the plurality of commands for packaging in the packet based on the task descriptors.

In a fourteenth aspect, in combination with one or more of the first aspect through the thirteenth aspect, the transmitting of the packet is performed after waiting a predetermined period of time for additional commands for the packed command.

In a fifteenth aspect, in combination with one or more of the first aspect through the fourteenth aspect, the memory controller couples the host device to a memory system comprising a flash memory device configured as a universal flash storage (UFS) device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 4A-E, 5, or 6 may be combined with one or more blocks (or operations) described with reference to another of the figures. For example, one or more blocks (or operations) of FIG. 1 may be combined with one or more blocks (or operations) of FIG. 3. As another example, one or more blocks associated with FIG. 1 may be combined with one or more blocks (or operations) associated with FIGS. 4A-E, 5, or 6. Additionally, or alternatively, one or more operations described above with reference to FIGS. 1-3 may be combined with one or more operations described with reference to FIGS. 4-6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
a memory controller of a host device configured to couple the host device to a memory system through a first interface, the memory controller configured to perform operations including:
receiving, by the memory controller of the host device, a plurality of commands for execution by a flash memory device;
packaging, by the memory controller of the host device, the plurality of commands as a packed command in a packet, wherein the packet comprises a packed command universal flash storage (UFS) Protocol Information Unit (UPIU) comprising a plurality of command UFS Protocol Information Units (UPIUs) corresponding to the plurality of commands, and wherein a header of each of the plurality of command UPIUs includes a first field indicating each of the plurality of command UPIUs is part of the packed command and a second field indicating a sequence number for each of the plurality of command UPIUs in relation to each other of the plurality of command UPIUs; and
transmitting, by the memory controller of the host device to the flash memory device, the packet comprising the packed command for execution by the flash memory device.

2. The apparatus of claim 1, wherein:
the memory controller is configured to further perform operations including:
determining a command acknowledgement delay for the memory system, and
the operation of packaging the plurality of commands as the packed command is based on the command acknowledgement delay satisfying a criteria.

3. The apparatus of claim 2, wherein:
the memory controller is configured to further perform operations including:
increasing a mode of operation for the first interface after determining the command acknowledgement delay satisfies the criteria, and
the operation of transmitting the packed command comprising the packed command is performed on the first interface after increasing the mode of operation.

4. The apparatus of claim 2, wherein the memory controller is configured to further perform operations including:
determining a second command acknowledgement delay for the memory system; and
when the second command acknowledgement delay satisfies a second criteria, transmitting a second plurality of commands in a plurality of packets for execution by the flash memory device.

5. The apparatus of claim 2, wherein the operation of packaging the plurality of commands as the packed command is based on the command acknowledgement delay exceeding a predetermined threshold.

6. The apparatus of claim 1, wherein the memory controller is configured to further perform operations including:

applying, by the memory controller of the host device, task descriptors to the plurality of commands; and prioritizing a first subset of the plurality of commands for packaging in the packet based on the task descriptors.

7. The apparatus of claim 1, wherein the transmitting of the packet is performed after waiting a predetermined period of time for additional commands for the packed command.

8. The apparatus of claim 1, wherein the memory controller couples the host device to a memory system comprising a flash memory device configured as a universal flash storage (UFS) device, and wherein the plurality of commands is received from a storage driver.

9. A method, comprising:
receiving, at a memory controller of a host device, a plurality of commands for execution by a flash memory system;
packaging, by the memory controller of the host device, the plurality of commands as a packed command in a packet, wherein the packet comprises a packed command universal flash storage (UFS) Protocol Information Unit (UPIU) comprising a plurality of command UFS Protocol Information Units (UPIUs) corresponding to the plurality of commands, and wherein a header of each of the plurality of command UPIUs includes a first field indicating each of the plurality of command UPIUs is part of the packed command and a second field indicating a sequence number for each of the plurality of command UPIUs in relation to each other of the plurality of command UPIUs; and
transmitting, by the memory controller of the host device to the flash memory system, the packet comprising the packed command for execution by the flash memory system.

10. The method of claim 9, wherein:
the memory controller is configured to further perform operations including:
determining a command acknowledgement delay for the flash memory system, and
the operation of packaging the plurality of commands as the packed command is based on the command acknowledgement delay satisfying a criteria.

11. The method of claim 10, wherein:
the memory controller is configured to further perform operations including:
increasing a mode of operation for a first interface between the host device and the flash memory system after determining the command acknowledgement delay satisfies the criteria, and
the operation of transmitting the packed command comprising the packed command is performed on the first interface after increasing the mode of operation.

12. The method of claim 10, wherein the memory controller is configured to further perform operations including:
determining a second command acknowledgement delay for the flash memory system; and
when the second command acknowledgement delay satisfies a second criteria, transmitting a second plurality of commands in a plurality of packets for execution by the flash memory system.

13. The method of claim 10, wherein the operation of packaging the plurality of commands as the packed command is based on the command acknowledgement delay exceeding a predetermined threshold.

14. The method of claim 9, wherein the memory controller is configured to further perform operations including:
applying, by the memory controller of the host device, task descriptors to the plurality of commands; and prioritizing a first subset of the plurality of commands for packaging in the packet based on the task descriptors.

15. The method of claim 9, wherein the transmitting of the packet is performed after waiting a predetermined period of time for additional commands for the packed command.

16. The method of claim 9, wherein the memory controller couples the host device to a memory system comprising a flash memory device configured as a universal flash storage (UFS) device, and wherein the plurality of commands is received from a storage driver.

17. An apparatus, comprising:
a memory controller:
coupled to a memory module through a first channel and configured to access data stored in the memory module through the first channel; and
coupled to a host device through a first interface and configured to communicate with the host device over the first interface,
the memory controller configured to perform operations comprising:
receiving, from the host device, a packed command in a packed command packet,
the packed command comprising a plurality of commands, wherein the packed command packet comprises a packed command universal flash storage (UFS) Protocol Information Unit (UPIU);
determining a plurality of command UFS Protocol Information Units (UPIUs) corresponding to the plurality of commands from the packed command packet,
wherein determining the plurality of command UPIUs comprises:
determining a first field in a header of each of the plurality of command UPIUs indicates each of the plurality of command UPIUs is part of the packed command; and
determining a sequence of the plurality of command UPIUs based on a second field in the header of each of the plurality of command UPIUs; and
transmitting, to the host device, an acknowledgment frame corresponding to the plurality of commands after receiving the packed command packet.

18. The apparatus of claim 17, wherein:
determining the first field in the header of each of the plurality of command UPIUs indicates each of the plurality of command UPIUs is part of the packed command comprises determining a sixth byte of the header comprises a packed flag; and
determining the sequence comprises determining the sequence based on a fifth byte of the header.

19. The apparatus of claim 17, wherein the memory controller is configured to perform further operations comprising:
receiving, from the host device, a query request for information regarding a capability of the memory controller; and
transmitting, to the host device, a response indicating the capability of the memory controller supports packed commands.

20. A method, comprising:
receiving, at a memory controller of a memory system from a host device, a packed command in a packed command packet, the packed command comprising a plurality of commands, wherein the packed command packet comprises a packed command universal flash storage (UFS) Protocol Information Unit (UPIU);

determining a plurality of command UFS Protocol Information Units (UPIUs) corresponding to the plurality of commands from the packed command packet,
wherein determining the plurality of command UPIUs comprises:
determining a first field in a header of each of the plurality of command UPIUs indicates each of the plurality of command UPIUs is part of the packed command; and
determining a sequence of the plurality of command UPIUs based on a second field in the header of each of the plurality of command UPIUs; and
transmitting, by the memory controller to the host device, an acknowledgment frame corresponding to the plurality of commands after receiving the packed command packet.

21. The method of claim 20, wherein:
determining the first field in the header of each of the plurality of command UPIUs indicates each of the plurality of command UPIUs is part of the packed command comprises determining a sixth byte of the header comprises a packed flag; and
determining the sequence comprises determining the sequence based on a fifth byte of the header.

22. The method of claim 20, further comprising:
receiving, from the host device, a query request for information regarding a capability of the memory controller; and
transmitting, to the host device, a response indicating the capability of the memory controller supports packed commands.

* * * * *